United States Patent [19]

Bates et al.

[11] 4,109,232
[45] Aug. 22, 1978

[54] CORRECTION AND TRANSMISSION SYSTEM FOR DIRECTIONAL TARGET INFORMATION

[75] Inventors: Albert M. Bates, Southampton; Wayne H. Sandford, Jr., Warrington; Anthony J. Madera, Doylestown, all of Pa.

[73] Assignee: The United States of America as represented by the Secretary of the Navy, Washington, D.C.

[21] Appl. No.: 804,041

[22] Filed: Jun. 6, 1977

[51] Int. Cl.² ............................................. G01S 3/80
[52] U.S. Cl. ..................................... 340/6 R; 340/2; 340/16 R; 343/113 R
[58] Field of Search ......................... 340/2, 6 R, 16 R; 343/113 R (U.S. only)

[56] References Cited

U.S. PATENT DOCUMENTS 4,017,822  4/1977  Rusch ............................... 340/6 R X Primary Examiner—Richard A. Farley
Attorney, Agent, or Firm—R. S. Sciascia; Henry Hansen; Stanton D. Weinstein

[57] ABSTRACT

An object detection system capable of receiving and processing an omnidirectional signal and two directional signals to produce a digitized omnidirectional signal, and digitized directional signals which have been corrected to magnetic north. The directional hydrophones produce $\sin \theta$ and $\cos \theta$ signals, where $\theta$ is the bearing angle of the sensed target from the directional hydrophones' y-axis. Each of the three signals is picked up by a separate hydrophone and is passed through an associated preamplifier and a shaper amplifier and low pass filter before being simultaneously sampled by separate sample/hold circuits. The three sampled signals are multiplexed to an analog to digital converter. The signal produced by a digital magnetic compass is converted to $\sin \theta$ and $\cos \theta$ values by appropriate function generators, where $\theta$ is the angle between the y-axis and magnetic north. The digital $\sin \theta$, $\cos \theta$, $\sin \phi$ and $\cos \phi$ signals are the multiplied together in a multiplier and the products placed in separate registers and added or subtracted by an adder to produce directional signals corrected to magnetic north according to the formulas $\sin \theta \cos \phi - \cos \theta \sin \phi = \sin (\theta - \phi)$ and $\cos \theta \cos \theta + \sin \theta \sin \phi = \cos (\theta - \phi)$. The corrected directional signals are then multiplexed together with the omnidirectional signal and a synchronization word and passed through an encoder to a transmitter for transmission to a distant receiver for processing and analysis.

12 Claims, 5 Drawing Figures

CORRECTION AND TRANSMISSION SYSTEM FOR DIRECTIONAL TARGET INFORMATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to object detection systems, and more particularly to underwater directional object detection systems.

In detection of the distance or direction of a distant object from a sensor system capable of receiving signals therefrom, such as in an underwater sonobuoy system for submarine detection, the sensor system generally is not oriented towards a known reference such as magnetic north. When the sensor system transmits information to a distant receiver, lack of such a reference makes it difficult for the distant receiver to properly analyze the information received to produce correct information concerning the location of the detected object. Previous methods of correcting the sonobuoy signals to magnetic north have involved including a separate signal from an on-board compass in the signals transmitted to the receiver. The resulting signals received at the distant receiver are then processed there. In such a situation, the transmitted compass signal would be subject to distortion, interference and noise in the medium. Furthermore, in such systems, the transmitted signals would not be directly applicable to a computer type processor, and would require processing and conversion to be so directly applicable. In addition, such systems do not lend themselves to built-in testing of the individual sensor/transmitter system, since the compass correction is not performed until signals are processed at the receiver. This makes it difficult to determine whether the sensor/transmitter system is malfunctioning, which such system (if several are being used) is malfunctioning if any, or whether the problem lies in the distant receiver.

SUMMARY OF THE INVENTION

Accordingly, it is a general purpose of the present invention to provide apparatus which gives an accurate indication of the direction of the target therefrom.

Other objects of the present invention are to provide apparatus for determining the bearing of a remotely located acoustic signal source, having improved bearing accuracy, producing a directional signal corrected to magnetic north, having improved reliability, producing a signal capable of being provided upon reception and demodulation directly to a computer processor without additional processing, and capable of being individually tested from a remote control point to determine whether a failure therein has occurred.

Briefly, these and other objects of the invention are accomplished by a target detection system, capable for use in a sonobuoy, for receiving three signals, one omnidirectional and two directional, and for digitizing them, correcting the two directional signals to reference magnetic north, and multiplexing these signals for transmission. Each of the three signals is picked up by a separate hydrophone and an associated preamplifier. The directional signals are indicative of $\sin \theta$ and $\cos \theta$ for the target, where $\theta$ is the angle between the target and the y-axis of the system. Each of these signals is then processed by a separate shaper amplifier. The three shaper amplifier output signals are then simultaneously sampled by three respective sample/hold circuits, and the sampled signals are multiplexed to an analog/digital converter. A digital magnetic compass produces a signal indicating the angle $\phi$ between magnetic north and the system y-axis, which signal is passed through parallel sine and cosine function generators that produce sine $\phi$ and cosine $\phi$ signals. The sine $\phi$ and cosine $\phi$ signals are provided to a multiplier for multiplication with the sine $\theta$ and cosine $\phi$ signals to produce the products $\sin \theta \sin \phi$, $\cos \theta \cos \phi$, $\cos \theta \sin \phi$, and $\sin \theta \cos \phi$. The appropriate products are then added or subtracted to produce the corrected directional signals $\cos \theta \cos \phi + \sin \theta \sin \phi = \cos (\theta - \phi)$ and $\sin \theta \cos \phi - \cos \theta \sin \phi = \sin (\theta - \phi)$, which are referenced to magnetic north. These corrected directional signals are then multiplexed in serial transmission with the digitized omnidirectional signal and with a synchronization signal, and passed through an encoder to a transmitter for transmission to a distant receiver for analysis.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
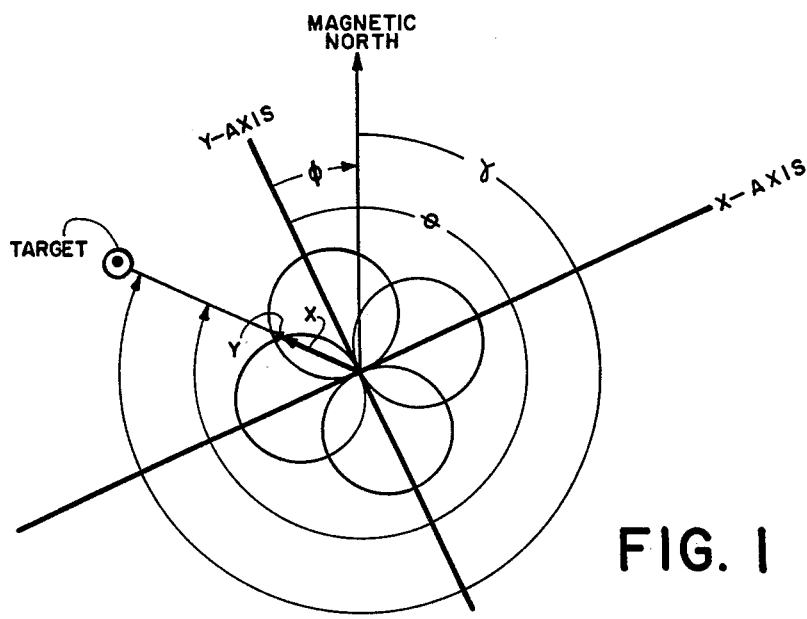
FIG. 1 shows the azimuthal directivity patterns for a directional hydrophone array employed in the present invention showing the angular relationship between magnetic north, the hydrophone array heading or y-axis, and the direction of a target sensed by the hydrophone array.

Referring now to the drawings, there is shown in FIG. 1 the azimuthal directivity patterns for two bidirectional hydrophones for a sonobuoy, the hydrophones being disposed beneath the surface of the water. Each bidirectional hydrophone has a sensitive axis of maximum response to incoming energy, the two hydrophones being arranged or affixed to a supporting structure with their sensitive axes orthogonal to each other to form the respective x-axis and y-axis of the array. FIG. 1 shows the relationship between magnetic north, the y-axis of the directional hydrophone array, the direction of a target sensed by the hydrophone array, and the response of each directional hydrophone to the target. The target can be a remote source of acoustic signals sensed by the hydrophone array. The hydrophone having its sensitive axis of maximum response on the y-axis produces a signal Y proportional to cosine $\theta$, where $\theta$ is the bearing from the y-axis of the target sensed by the hydrophone. Similarly, the hydrophone having its axis of maximum response on the x-axis produces a signal X proportional to sine $\theta$. Accordingly, the y-axis hydrophone is hereinafter referred to as the cos θ hydrophone 15, and the x-axis hydrophone is hereinafter referred to as the sin θ hyrophone 13. However, neither axis of the hydrophone array is generally aligned with any particular fixed reference readily ascertainable by a distant receiver, such as magnetic north. In fact, many sonobuoys experience a rate of rotation of a few revolutions per minute, so that the orientation of their respective hydrophone arrays would vary with time with respect to magnetic north. In general, the y-axis of this hydrophone array is not aligned with magnetic north but is displaced therefrom by an angle φ. Accordingly, the bearing of the target with respect to magnetic north would be θ − φ = γ, where θ and φ are measured clockwise from the y-axis, and γ is measured clockwise from magnetic north.

Figure 4:
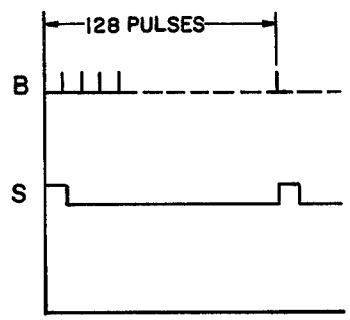
FIG. 4 is another waveform timing chart describing signals generated and received by the system of FIG. 2.
Figure 5:
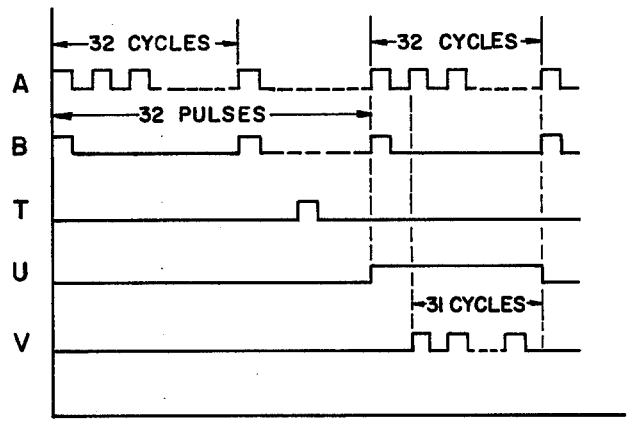
FIG. 5 is another waveform timing chart describing signals generated and received by the system of FIG. 2.
Figure 2:
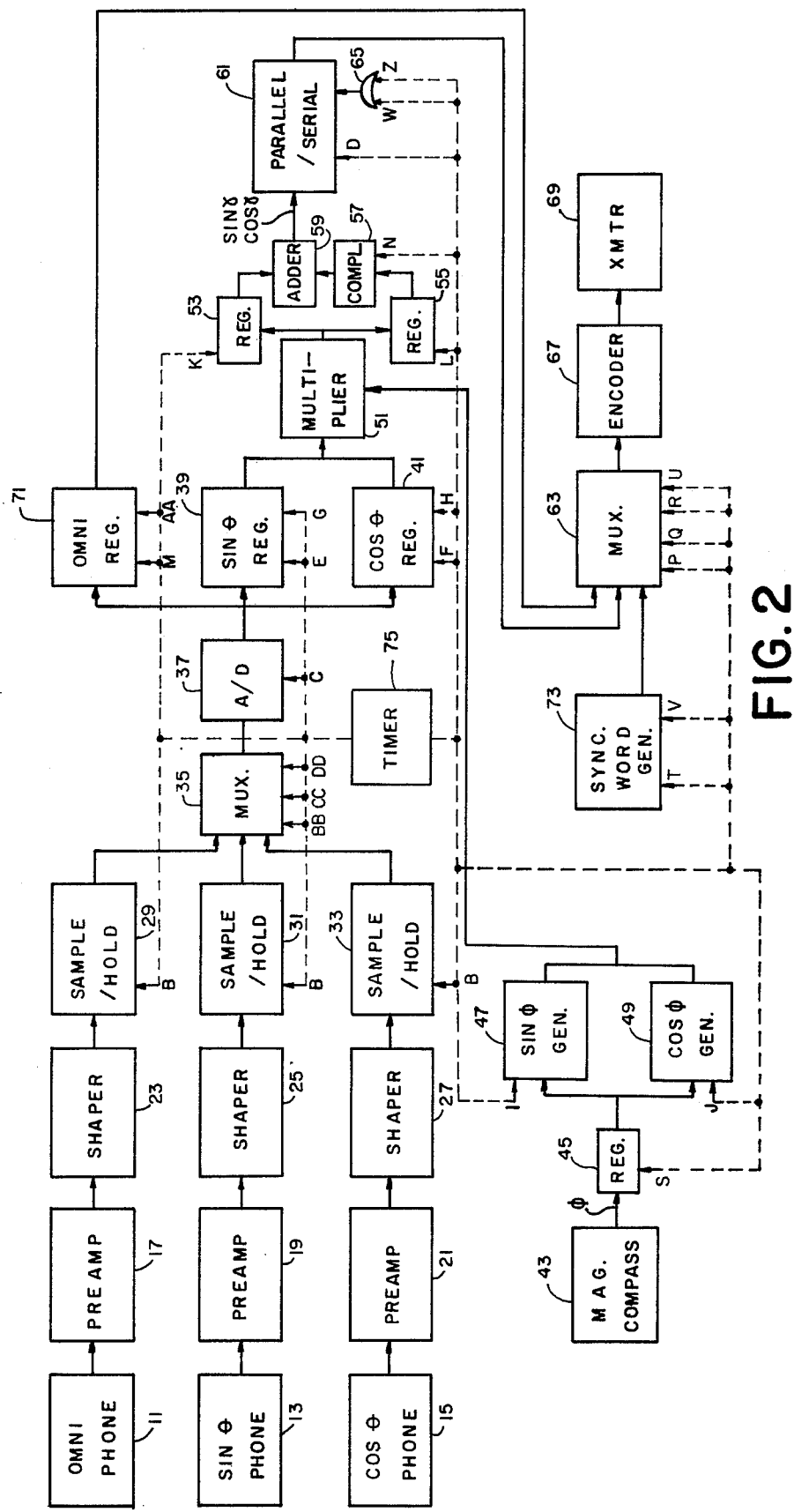
FIG. 2 is a block diagram of a directional target bearing correction and signal transmission system according to the present invention.
Figure 3:
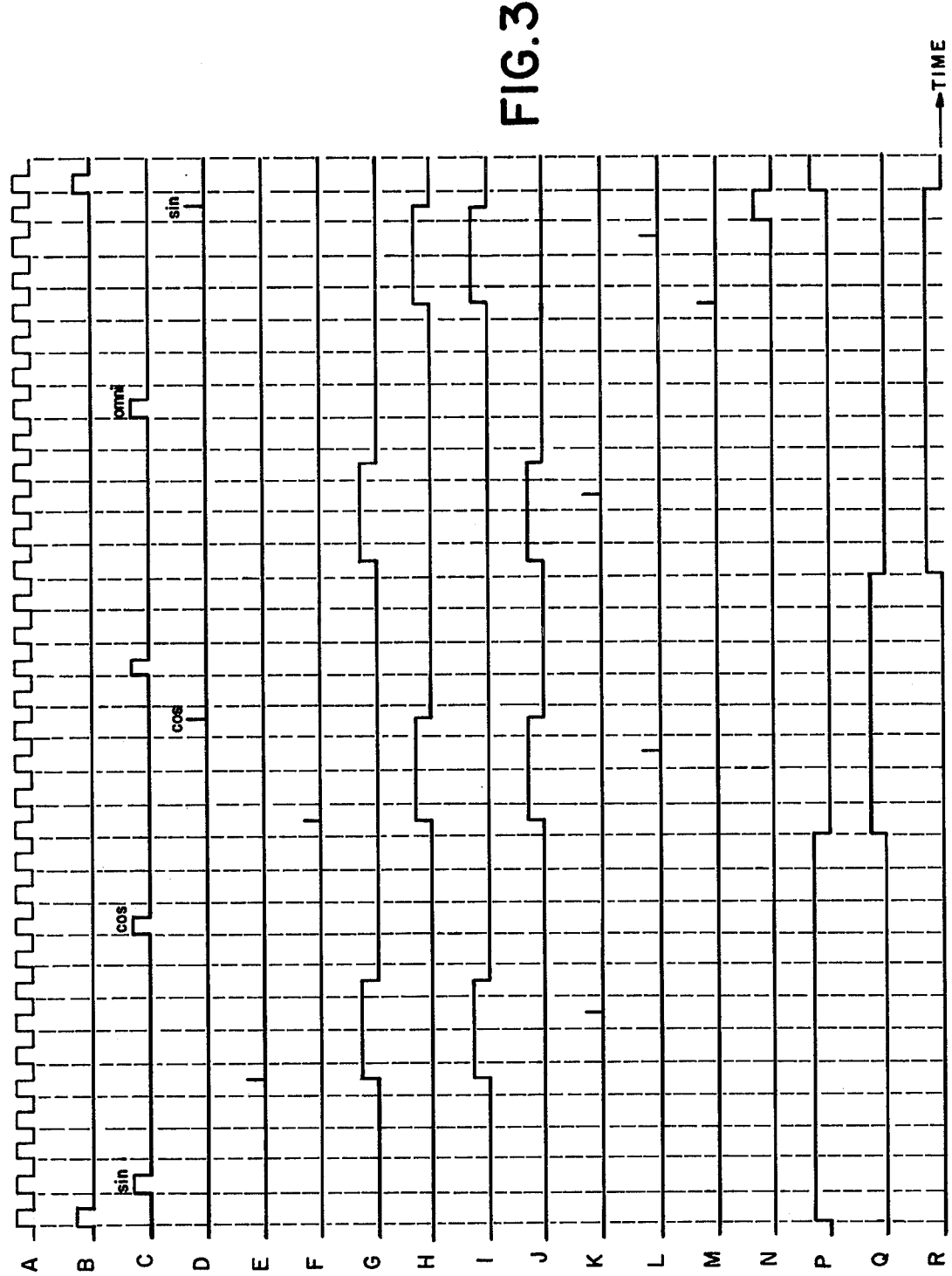
FIG. 3 is a waveform timing chart describing signals generated and received by the system of FIG. 2.

A system capable of correcting the bearing of the target, as sensed by the directional hydrophones in the array of FIG. 1, to magnetic north is shown in FIG. 2, and is incorporated within a sonobuoy unit having an omnidirectional hydrophone 11 and directional hydrophones 13 and 15 with their associated amplifiers 17, 19 and 21. Where omnidirectional hydrophone 11 sensing a target produces a signal $E_s \sin \omega t$, directional hydrophone 13 produces a signal $E_s \sin \omega t \sin \theta$ and directional hydrophone 15 produces a signal $E_s \sin \omega t \cos \theta$. Omnidirectional and directional hydrophones particularly as used in a sonobuoy are more fully described in U.S. Pat. No. 3,870,989 to Alfred L. Mallet. The respective signals produced by hydrophones 11, 13 and 15 pass through respective preamplifiers 17, 19 and 21 to respective shapers 23, 25 and 27. Each shaper 23, 25 and 27 is a shaper amplifier and low pass filter which amplifies the respective preamplifier 17, 19, 21 output signal, filters out undesired high-frequency noise so that only the signals of the desired bandwidth are produced, and accomplishes spectral shaping of the respective preamplifier signal to counteract the 6.0 decibel per octave falloff of the received signals resulting from their transmission through the sea. The signals produced by respective shapers 23, 25 and 27 are then processed by respective sample-hold circuits 29, 31 and 33. Sample-hold circuit 29, upon being pulsed by signal B of FIG. 3, samples, at that instant, the voltage amplitude of the output signal of shaper 23, and provides a constant voltage signal of that voltage to analog multiplexer 35. Signal B of FIG. 3, like the other timing signals shown in FIGS. 3, 4 and 5, is dependent upon clock signal A of FIG. 3. Since the pulse rate of sampling signal B is dependent upon the desired signal band to be monitored, the frequency of clock signal B is chosen to satisfy the sonic band of interest. Sample-hold circuits 31 and 33 are also simultaneously pulsed by signal B to sample and hold the signals produced by respective shapers 25 and 27, and provide the resulting respective voltages to multiplexer 35. Multiplexer 35 receives and multiplexes sequentially the signals produced by sample-hold circuits 29, 31 and 33, and provides these signals to analog to digital converter 37. Analog to digital converter 37, upon being pulsed by signal C of FIG. 3, converts the signal received from multiplexer 35 to an eight bit parallel digital signal. As shown in FIG. 3, analog to digital converter 37 as controlled by signal C first digitizes the sin θ signal, then the cos θ signal, and then a delay to permit correction of the sin θ and cos θ directional signals to magnetic north is allowed, since the omnidirectional signal is digitized on the fourth pulse of signal C and not on the third pulse. This process is then repeated following the next sampling of the hydrophone 11, 13, 15 signals caused by the pulse of signal B which occurs again after 32 cycles of the clock signal A. Accordingly, multiplexer 35 first provides a sin θ directional signal to analog to digital converter 37, then produces the cos θ directional signal and then, after a delay, the omnidirectional signal, and these respective signals are digitized in that order by converter 37. Consequently, register 39 is first pulsed by signal E to be enabled to receive the digital sin θ signal from converter 37, after which register 41 is pulsed by signal F of FIG. 3 to be enabled to receive the digital cos θ directional signal from converter 37.

Digital magnetic compass 43 continuously produces an eight bit parallel digital signal indicating the angular deviation φ of the directional hydrophones' 13 and 15 y-axis from magnetic north, and provides that signal to compass register 45. An example of such a digital magnetic compass is described in *Magnetic Compass Operates At Depths to 22,000 Feet*. In Sea Technology. 16(2):p.15. Feb. 1975. Since the sonobuoy containing hydrophones 11, 13 and 15 has a rate of rotation of a few revolutions per minute, so that the directional hydrophones' y-axis angular deviation from magnetic north slowly but continuously varies with time, register 45, which operates in a manner similar to that described above for sample-hold circuits 29, 31 and 33, is repeatedly pulsed by signal S of FIG. 4 to sample, hold and provide to function generators 47 and 49 the compass 43 output signal. To avoid changing the compass signal produced by register 45 while the generator 47 and 49 signals are actually being used, the leading edge of the signal S pulse corresponds to the leading edge of a sampling signal B pulse, so that the hydrophone 11, 13 and 15 signals and the compass 43 signal are all sampled simultaneously. However, because of the slow rate of rotation of the sonobuoy, register 45 need not be pulsed by signal S every time that signal B pulses sample-hold circuits 29, 31 and 33, but can for example be pulsed once every 128 pulses of signal B. The compass signal produced by register 45 is constantly provided to function generators 47 and 49. Function generator 47 receives the φ signal produced by register 45, and when signal I of FIG. 3 is high, produces a digital eight bit signal representing sin φ. Function generator 49 also receives the φ signal produced by register 45 and produces an eight bit digital signal representing cos φ when signal J of FIG. 3 is high. Generators 47 and 49 can for example each be a National Semiconductor MN 5203 electrically programmable read only memory device, described in National Semiconductor MOS Integrated Circuits Catalog of April 1974, p. 3-8 to 3-12, wherein the respective signal I or J is inverted and received at pin 14, the φ signal is received, going from least to most significant bit, at pins 3, 2, 1, 21, 20, 19, 18 and 17, the corresponding sin φ or cos φ output signal is produced, going from least to most significant bit, at pins 4–11, pins 12, 15, 22 and 23 are tied to +5 volts d.c., pin 24 is connected to ground, and pins 13 and 16 are tied to −12 volts d.c. For a nine bit signed binary signal, where magnetic compass 43 produces a signal in eight bit gray code which is converted to eight bit binary code, the most significant bit of the gray code can be used as the sign bit for the sin φ signal and the second most significant bit of the gray code can be used as the sign bit for the cos φ signal, appropriately switched in when the output signal I or J appears high.

The sin θ and cos θ directional signals are corrected to magnetic north by appropriate multiplication and addition with the sin φ and cos φ signals according to the formulas sin θ cos φ − cos θ sin φ = sin (θ − φ) = sin γ and cos θ cos φ + sin θ sin φ = cos (θ − φ) = cos γ. After the sin θ and cos θ signals have been loaded into registers 39 and 41 respectively, when signal G of FIG. 3 goes high, register 39 receiving signal G provides the sin θ signal to multiplier 51, which can be an 8 × 8 bit multiplier. Simultaneously, signal I goes high, so sin φ generator 47 provides the sin φ signal to multiplier 51 which then produces the product sin θ sin φ. While signals G and I are high and the product sin θ sin φ is being produced, register 53 is pulsed by signal K of FIG. 3 so that the product sin θ sin φ is loaded into register 53 and not register 55. A signal can be loaded into register 53 or register 55 only when pulsed by its respective loading signal K or L. After signals G, I and K have gone low, output signals H and J of FIG. 3 go high, so register 41 and generator 49, respectively, provide their respective output signals cos θ and cos φ to multiplier 51 for multiplication. While signals H and J are high, register 55 is pulsed by load signal L for loading of the product cos θ cos φ into register 55. Because add-subtract signal N received by complementer 57 is low during this time, complementer 57 receives but does not complement the signal contained in and produced by register 55 and provides that signal uncomplemented to adder 59. Adder 59 receives and adds the signals contained in and produced by register 53 and complementer 57. Adder 59 thus adds the signals cos θ cos φ and sin θ sin φ from register 53 and complementer 57 to produce the signal cos γ which has been corrected to magnetic north, and provides this signal to parallel to serial converter 61. Converter 61 is then pulsed by signal D so that cos γ which is now available can be loaded into converter 61. When shift out signal R of FIG. 3 received by multiplexer 63 is high, multiplexer 63 receives the first bit of cos γ and connects the output of converter 61 to the input of encoder 67 through which the serial cos γ data passes to transmitter 69 for transmission to a distant receiver (not shown). After a delay of one signal A cycle to allow the first bit of cos γ to be provided to multiplexer 63, eleven signal A pulses are applied as signal W to converter 61 to clock out serially the eleven remaining bits of cos γ while signal R remains high. All cos γ data has been shifted out of converter 61 when signal R returns to the low state.

While signal R is high, signals G and J also go high so that the sin θ and cos φ signals are multiplied by multiplier 51. Register 53 is then pulsed by signal K to receive the product sin θ cos φ. Signals H and I then go high and G and J go low so that the cos θ and sin φ signals are provided to and multiplied by multiplier 51. Register 55 is then pulsed by signal L to load the product cos θ sin φ into register 55. Signal N is now high so that the data from register 55 is complemented by complementer 57. The signals from register 53 and complementer 57 are added by adder 59 to yield the sin γ signal corrected to magnetic north. When signals H and I return to the low state, signal D pulses converter 61 to load sin γ therein. While signals H and I are high, which is after signal C has pulsed converter 37 to digitize the omnidirectional signal, signal M pulses register 71 to load the parallel omnidirectional data therein. After signals D, H and I return to the low state, signal B agains pulses sample-hold circuits 29, 31, and 33 to begin a new sampling and correction cycle. When shift out signal P of FIG. 3 received by multiplexer 63 is high, multiplexer 63 receives the first bit of sin γ and connects the output of converter 61 to the input of encoder 67 through which the serial sin γ data passes to transmitter 69 for transmission to a distant receiver (not shown). After a delay of one signal A cycle to allow the first bit of sin γ to be provided to multiplexer 63, eleven signal A pulses are applied as signal Z to converter 61 to clock out serially the eleven remaining bits of sin γ while signal P remains high. Since signals W and Z both clock serial data out of converter 61, they can be applied to the same input terminal of converter 61 via OR gate 65. All sin γ data has been shifted out of converter 61 when signal P returns to the low state. After this process is completed and signal P goes low, shift out signal Q received by multiplexer 63 goes high so that multiplexer 63 receives the first bit of serial omnidirectional data from register 71, and connects the output of register 71 to encoder 67. After a delay of one signal A cycle to allow the first bit of omnidirectional data to be provided to multiplexer 63, seven signal A pulses are applied as signal AA to register 71 to clock out serially the seven remaining bits of omnidirectional data while signal Q remains high. All omnidirectional data has been shifted out of register 71 when signal Q returns to the low state.

Because the cos γ and sin γ words are of twelve bits each and each omnidirectional word is of eight bits, so that signals R and P each remain high for twelve signal A cycles and signal Q remains high for eight signal A cycles, signal B goes high and each sampling and correction cycle lasts 12 + 12 + 8 = 32 signal A cycles, and the present invention produces a 32-bit data word. The products arriving at adder 59 can be in two's complement form, and can be converted into that form by placing an appropriate converter at the output of multiplier 51. The directional data transmitted by transmitter 69 could then be in two's complement form. Also, should γ prove to be negative, it can be corrected by adding 360° thereto, since for any angle X sin X = sin (360° + X) and cos X = cos (360° + X).

Registers 39 and 41 can for example each be three RCA digital integrated circuits CD4076B 4-bit D-type registers, described in *RCA Integrated Circuits DATA-BOOK* SSD-210 (April 1976), pages 572–574, wherein pins 11-14 either receive parallel data or else if not needed are connected to ground, pins 1 and 2 both receive inverted signal G (for register 39) or H (for register 41), respectively; pins 8, 9, 10 and 15 are tied to ground; pin 16 is tied to +5 volts d.c.; pin 7 receives signal E (for register 39) or F (for register 41); and pins 3–6 either produce parallel data or, if unneeded, are left open. Register 39 can for example be composed of three such devices in parallel where pins 11 to 14 of the first two devices and pin 14 of the third device receives parallel data and pins 3–6 of the first two devices and pin 3 of the third device produces parallel data and is connected to multiplier 51, pins 11–13 on the third device are connected to ground, and pins 4–6 on the third device are left open. Register 41 can be similarly so connected. Multiplier 51 can for example be composed of a four by four array of Motorola MC 14554 binary multiplier devices, described in *McMOS Integrated Circuits Data Book*, Motorola Semiconductor Products Inc., 1973, December 1973, p. 7-227 to 7-231, which array can be arranged and connected in a manner similar to that shown on page 7-231 thereof for a three by three array. Registers 53 and 55 can for example each be composed of three RCA CD4076B devices wherein for each device pins 1, 2, 8, 9, 10 and 15 are connected to ground, pin 16 is connected to +5 volts d.c., and pins 11–14 are connected to multiplier 51 to receive parallel data. For register 53, pins 3–6 are connected to adder 59 to provide parallel data thereto, and pin 7 is connected to receive loading signal K. For register 55, pins 3–6 are connected to complementer 57 to provide parallel data thereto, and pin 7 receives signal L. Complementer 57 can be composed of three RCA CD4019A quad AND-/OR select gate devices described in *RCA*, supra, pages 405–406, wherein pins 6, 4, 2 and 15 receive parallel data from register 55, pins 7, 5, 3 and 1 receive the same parallel data inverted (for example by RCA CD4049A inverters described in *RCA*, supra, pages 481–483), pins 10–13 are connected to adder 59 to produce parallel data, pin 8 is connected to ground, pin 16 is connected to +5 volts d.c., pin 14 is connected to receive signal N, and pin 9 is connected to receive signal N via an inverter such as an RCA CD4049 inverter described above. Adder 59 can be composed of three RCA CD4008A 4-bit full adder devices described in *RCA*, supra, pages 378–379 wherein pins 7, 5, 3 and 1 receive parallel data from register 53, pins 6, 4, 2 and 15 receive parallel data from complementer 57, pins 10, 11, 12 and 13 are connected to converter 61 to transfer parallel data thereto, pin 8 is connected to ground and pin 16 is connected to +5 volts d.c. Where the data signals received by adder 59 to be added are in two's complement form, the carry in bit is supplied by signal N; the CD4008A device receiving and processing the least significant bit has pin 9 connected to receive signal N and pin 14 connected to pin 9 of the next such device, pin 14 of that device is connected to pin 9 of the third device, and pin 14 of the third device is left open. Converter 61 and register 71 can each include RCA CD4021A 8-stage static shift registers described in *RCA*, supra, pages 410–412. For converter 61, two such devices are used, wherein pins 1, 15, 14, 13, 4, 5, 6 and 7 of one device receive parallel data from adder 59, pin 11 of that device is connected to pin 3 of the other device, pin 3 of that device produces serial data, pin 16 of both devices is connected to +5 volts d.c., pin 8 of both devices is connected to ground, pin 9 of both devices receives signal D, pin 10 of both devices receives the clock signal from gate 65, pins 1, 15, 14 and 13 of the second device receive parallel data from adder 59, and pins 4, 5, 6, 7 and 11 of the second device are connected to ground. For register 71 pins 1, 15, 14, 13, 4–7 receive parallel data from converter 37, pin 3 provides serial data to multiplexer 63, pin 9 receives signal M, pin 16 is connected to +5 volts DC, pins 8 and 11 are connected to ground, and pin 10 receives clock signal AA. Encoder 67 can be a Miller encoder, a Manchester encoder, a biphase encoder, or any kind of self-clocking encoder. Encoder 67 can be clocked by signal A, or by signal A with a delay imposed thereon.

After a number of data words have been transmitted, a synchronization word produced by synchronization word generator 73 is multiplexed to encoder 67 for transmission via transmitter 69 to verify the accuracy of the data being transmitted. The synchronization word is an artificial, predetermined word whose contents and order of appearance are known at the distant receiver. As shown in FIG. 5, every 32 times that signal B pulses sample/hold circuits 29, 31 and 33, shift signal U of FIG. 5 received by multiplexer 63 goes high, so that multiplexer 63 connects the output of generator 73 to encoder 67. The synchronization word is provided serially by generator 73 to multiplexer 63. While signal U is high, delayed clock signal V of FIG. 5 clocks out the synchronization word serially from generator 73 to multiplexer 63. Since the sin $\gamma$, cos $\gamma$ and omnidirectional data produced per signal B pulse includes a total of 32 bits, the synchronization word is 32 bits long. When signal U goes high, the first bit of the synchronization word appears at multiplexer 63, and so need not be clocked out. Thus, signal V includes only 31 signal A pulses every time signal U goes high. Several hundred nanoseconds before, or at least some time before, signal U goes high, loading signal T of FIG. 5 applied to generator 73 goes high to load the synchronization word into generator 73. The synchronization word is hard-wired to generator 73 and is actually loaded therein by signal T. Generator 73 can for example be composed of four RCA CD4021A devices, wherein pins 1, 4–7 and 13–16 can be tied high to +5 volts or low to ground to provide the desired word, pin 10 is connected to clock signal V, pin 9 is connected to receive signal T. Pin 3 of one of the CD4021A devices is connected to multiplexer 63 and pin 11 of that device is connected to pin 3 of the second device, whose pin 11 is connected to pin 3 of the third device, whose pin 11 is connected to pin 3 of the fourth device, whose pin 11 is connected to ground.

Multiplexer 35 switches sin $\theta$ data from sample/hold circuit 31 to converter 37 when a received timing signal BB goes high. The leading edge of signal BB is simultaneous with the leading edge of the signal B pulse, and stays high for eight signal A cycles. When signal BB goes low, signal CC received by multiplexer 35 simultaneously goes high so that multiplexer 35 connects the output of sample/hold circuit 33 to the input of converter 37 for the transfer of cos $\theta$ data thereto. Signal CC stays high for eight signal A cycles and then goes low. Eight signal A cycles after signal CC goes low, during which multiplexer 35 switches no data, signal DD received by multiplexer 35 goes high, so that multiplexer 35 connects the output of sample/hold circuit 29 to the input of converter 37 for the transfer of omnidirectional data thereto. Signal DD stays high for eight signal A cycles and then goes low, whereupon signals B and BB again go high to begin another sampling and correction cycle. Note that there is a delay of one signal A cycle between the leading edges of signals BB, CC and DD and the respective leading edges of signal C.

The relationship between signals A and B and signals R and W, P and Z, and Q and AA is similar to that shown in FIG. 5 for signals A and B and signals U and V, except that signals R, W, P, Z, Q and AA go high during every sampling cycle of signal B and not once every 32 such cycles. Also, the leading edges of signals Q and R do not occur simultaneously with the leading edge of the signal B pulse, as can be seen in FIG. 3. In addition, delayed clock signal W, Z, AA goes high only while the respective shift out signal R, P, Q is high.

Timing signals are produced by timer 75.

It should be understood that various short delays can be imposed upon the signals of FIGS. 3, 4 and 5 as needed to account for delayed response in the various components of the system of FIG. 2 and to prevent undesired mixing of data therein.

Obviously, many modifications and variations of the present invention are possible in light of the above teachings. It is therefore to be understood that within the scope of the appended claims the invention may be practiced otherwise than as specifically described.

What is claimed is:

1. A system for correcting the bearing of a target from one reference to another, comprising:
   first receiving means for alternately producing respective signals indicative of the sine and cosine of the bearing $\theta$ to the target from the one reference;
   reference means for alternately producing respective signals indicative of the sine and cosine of the angular deviation $\phi$ between the references;
   multiplying means synchronously receiving said sine $\theta$, consine $\theta$, sine $\phi$ and cosine $\phi$ signals for producing signals indicative of $\sin \theta \sin \phi$, $\cos \theta \cos \phi$, $\sin \theta \cos \phi$ and $\cos \theta \sin \phi$, respectively; and
   adding means sequentially receiving the multiplying means signals for producing signals indicative of sine $\gamma$ and cosine $\gamma$ wherein $\gamma = \theta - \phi$.

2. A system as defined in claim 1, wherein said first receiving means comprises:
   timing means for producing a timing signal;
   first and second sample/hold means responsive to the sin $\theta$ and cos $\theta$ signals, respectively, and to the timing signal for producing a sampled sin $\theta$ and cos $\theta$ signal, respectively, which is representative of some feature of the respective sin $\theta$ and cos $\theta$ signals upon receipt of the timing signal;
   first multiplexing means receiving the sampled sin $\theta$ and cos $\theta$ signals for multiplexing the sin $\theta$ and cos $\theta$ signals on a single output line; and
   first and second registers connected to said output line and responsive to the timing signal and the respective sampled sin $\theta$ and cos $\theta$ signals for providing the respective sampled sin $\theta$ and cos $\theta$ signals to said multiplying means as sequenced by the timing signal.

3. A system as defined in claim 1, further comprising: a transmitter receiving the sin $\gamma$ and cos $\gamma$ signals for transmitting the sin $\gamma$ and cos $\gamma$ signals to a distant receiver.

4. A system as defined in claim 3, further comprising:
   timing means for producing a timing signal;
   word generating means responsive to the timing signal for producing at intervals determined by the timing signal a predetermined word; and
   second multiplexing means responsive to the timing signal and receiving the sin $\gamma$, cos $\gamma$ and predetermined word signals for providing the sin $\gamma$, cos $\gamma$ and predetermined word signals sequentially to said transmitter.

5. A system as defined in claim 1, further comprising:
   timing means for producing a timing signal;
   second receiving means for producing an omnidirectional signal; and
   first multiplexing means responsive to the timing signal and receiving the sin $\gamma$, cos $\gamma$ and omnidirectional signals for producing the sin $\gamma$, cos $\gamma$ and omnidirectional signals sequentially.

6. A system as defined in claim 5, wherein said second receiving means comprises first sample/hold means responsive to said omnidirectional and timing signals for producing a sampled omnidirectional signal which is representative of some feature of the omnidirectional signal upon receipt of the timing signal.

7. A system as defined in claim 6 wherein said first receiving means comprises:
   second and third sample/hold means responsive to the sin $\theta$ and cos $\theta$ signals, respectively, and to the timing signal for producing a sampled sin $\theta$ and cos $\theta$ signal, respectively, which is representative of some feature of the respective sin $\theta$ and cos $\theta$ signals upon receipt of the timing signal;
   second multiplexing means receiving the sampled omnidirectional, sin $\phi$ and cos $\phi$ signals for multiplexing the omnidirectional, sin $\phi$ and cos $\theta$ signals on a single output line; and
   first and second registers connected to said output line and responsive to the timing signal and the respective sampled sin $\theta$ and cos $\theta$ signals for providing the respective sampled sin $\theta$ and cos $\theta$ signals to said multiplying means as sequenced by the timing signal.

8. A system as defined in claim 7, further comprising:
   a third register connected to said output line and responsive to the timing and omnidirectional signals for providing the omnidirectional signal to said first multiplexing means as sequenced by the timing signal.

9. A system as defined in claim 5, further comprising:
   a transmitter connected to said first multiplexing means for transmitting the sequential sin $\gamma$, cos $\gamma$ and omnidirectional signals to a distant receiver.

10. A system as defined in claim 9, further comprising:
    word generating means responsive to the timing signal for providing to said first multiplexing means at intervals determined by the timing signal a predetermined word,
    wherein said first multiplexing means provides the predetermined word to said transmitter upon production thereof by said word generating means.

11. A system as defined in claim 1 wherein said reference means comprises:
    timing means for producing a timing signal;
    signal means for producing a signal indicative of $\phi$; and
    first and second function generating means responsive to the timing and $\phi$ signals for producing the sine $\phi$ and cosine $\theta$ signals, respectively, as sequenced by the timing signal.

12. A system as defined in claim 1 wherein said adding means comprises:
    timing means;
    fourth and fifth registers connected to said timing means and in parallel to the output of said multiplying means for producing the multiplying means signals as sequenced by said timing means;
    selective complementing means connected to said fifth register and to said timing means for complementing the signal produced by said fifth register as sequenced by said timing means; and
    an adder connected to said fourth register and to said selective complementing means for adding the signals produced by said fourth register and by said selective complementing means to produce the sine $\gamma$ and cosine $\gamma$ signals.

* * * * *